Dec. 29, 1942.  A. STERN  2,306,573
ELECTRIC COOKING APPARATUS
Filed June 29, 1940
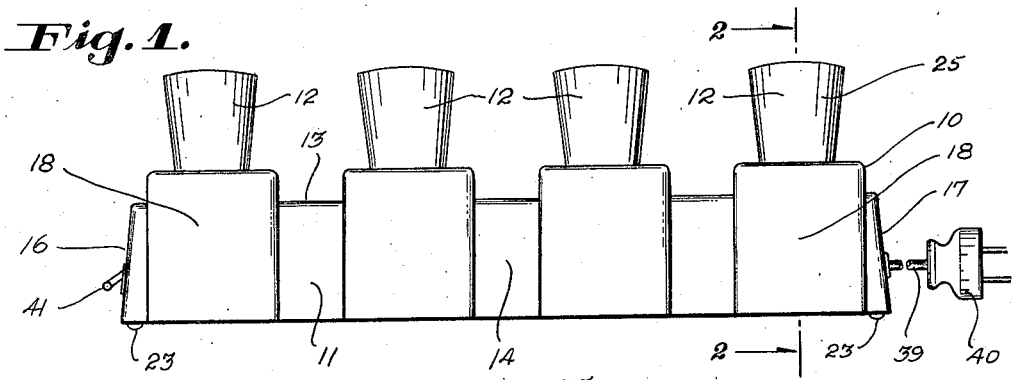
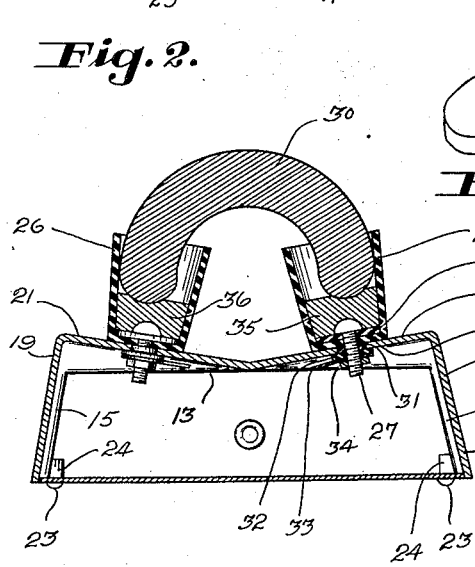
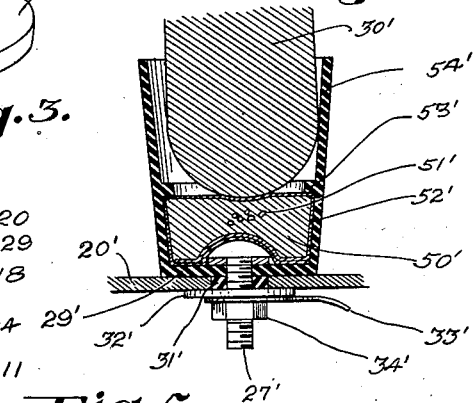
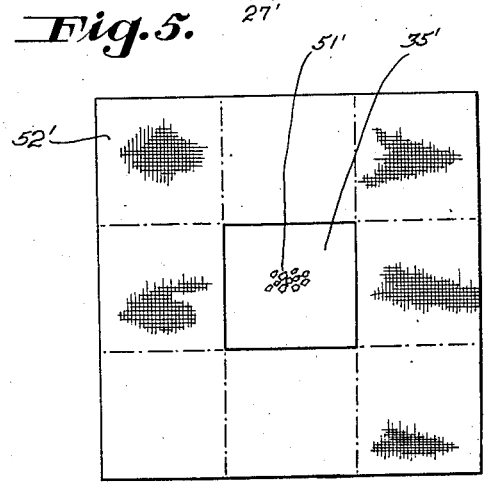
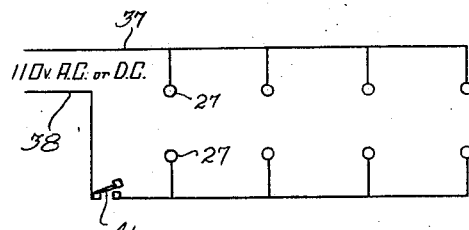
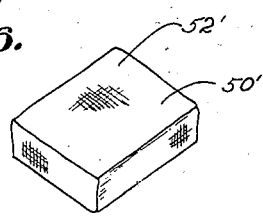
INVENTOR
ARTHUR STERN
BY
Richard S. Temko
ATTORNEY Patented Dec. 29, 1942

2,306,573

UNITED STATES PATENT OFFICE 2,306,573

ELECTRIC COOKING APPARATUS

Arthur Stern, Brooklyn, N. Y.

Application June 29, 1940, Serial No. 343,216

2 Claims. (Cl. 219—19)

This invention relates generally to the art of cooking, and more particularly to an electrical cooking apparatus for the proper cooking of frankfurters.

While it has been known in the prior art to puncture the ends of the frankfurter or to clamp the same in various ways in order to secure an electrical contact therewith so that the frankfurter acts as a resistance to the passage of the current, such methods and constructions have been open to serious disadvantages. One of the most important objections to the piercing of the skin covering or jacket of the frankfurter has been that as the frankfurter is cooked, the water content thereof boils and by reason of the pressure, a considerable amount of juice exudes outwardly through the orifices formed by the puncturing operation carrying with it a large amount of the food in the form of meat juices. Since the junction between the metallic electrode and the meat in the frankfurter presents a higher resistance to the flow of current than the central portion of the frankfurter, a very high heat is generated at this juncture, and the juices and the frankfurter meat thereat become burned and charred. When the frankfurter is removed from the device, not only does it have a decreased food value, but the burned portions of the meat and juice are relatively indigestible. Furthermore, since the ends of the frankfurter are seen during eating, the ugly gaping black holes left by the electrodes are exceedingly unappetizing and otherwise undesirable. Another disadvantage of such constructions lies in the fact that the electrodes themselves become covered with burned gravy and meat particles so that they are not only unsightly, but are unsanitary and are extremely difficult to clean, similar to the bottom of a burned fryingpan. Another disadvantage of such constructions lies in the fact that it is necessary to very accurately place the frankfurter with relation to the electrodes, otherwise the frankfurter will break away from the electrodes during the process of cooking. Another disadvantage lies in the fact that in frankfurter cooking constructions using electrodes which pierce the frankfurters, moving parts are usually required thereby resulting in greater complication and cost of the machine.

It has also been known in the prior art to make contact with the ends of the frankfurter by immersing said ends into electrolytic solutions of opposite polarity. Such constructions are also subject to certain disadvantages, among which is the fact that since the solution has a greater electrical conductivity than the frankfurter, the electric current passes from the solution into the frankfurter at a point adjacent the level of the solution. This results in the frankfurter being heated only along the electrical path of travel above the solution levels, and the ends of the frankfurter remain cold and uncooked.

Among the objects of the present invention is the provision of a frankfurter cooking machine in the use of which all of the disadvantages hereinabove set forth are avoided. In accordance with the present construction, it is not necessary to make direct metallic contact with the frankfurter, and while electrolytic solutions are used to make contact with the ends of the frankfurter, means are provided to prevent the current from short circuiting the ends of the frankfurter so that in accordance with applicant's improved construction, the entire frankfurter is uniformly cooked and heated.

Another object herein lies in the provision of a frankfurter cooking machine which does not burn the ends of the frankfurter and which is readily cleaned so that the same is quick and convenient in use.

Another object herein lies in the provision of a frankfurter cooking machine which is of simple construction, having no moving parts so that the same may be manufactured at low cost and have a consequent wide distribution.

These objects and other incidental ends and advantages will more fully appear in the progress of this disclosure and be pointed out in the appended claims.

In the drawing constituting a material part hereof, similar reference characters designate corresponding parts throughout the several views in which:

Figure 1 is an elevational view of a first embodiment of the invention.

Figure 2 is a vertical sectional view as seen from the plane 2—2 on Figure 1. In this figure a frankfurter is shown in cooking position.

Figure 3 is a view in perspective showing one of the conductor contact pads utilized in the first embodiment of the invention.

Figure 4 is an enlarged fragmentary vertical sectional view showing the construction of one of the contact cups in another form of the invention.

Figure 5 is a plan view showing the conducting pad of Figure 4 in a stage of the fabrication thereof.

Figure 6 is a view in perspective showing a finished conducting pad made in accordance with the step shown in Figure 5.

Figure 7 is a schematic electrical circuit.

Turning now to the first embodiment of the invention, the electrical cooking device indicated by numeral 10, comprises generally a base 11 and a plurality of cups indicated generally by numeral 12. In accordance with the present invention, each frankfurter requires two cups for the support thereof and for securing the proper electrical contact therewith so that the device shown in elevation in Figure 1 is suited for simultaneously cooking four frankfurters. Obviously, the device 10 may be extended to include additional pairs of cups or may be reduced so as to include only one pair. The size of the device will thus be determined by the number of frankfurters which it is desired to cook simultaneously.

The base 11 may be generally rectangular in shape and is preferably an inverted hollow vessel including the top wall 13, front wall 14, rear wall 15 and end walls 16 to 17. The top wall 13 and the front and rear walls 14 and 15 are provided with a plurality of projecting portions 18 and 19. The substantially vertically disposed portions of the projecting portions 18 and 19 are disposed substantially parallel to the walls 14 and 15 respectively, while the upper portions of the projecting portions 18 and 19 are angularly disposed with relation to the top wall 13 and to each other to form the cup mounting pedestals 20 and 21. The base 11 is provided with a bottom cover plate 22 which may be secured in place in any suitable manner, as for example by means of the rubber headed screws which serve as the feet 23 and which threadedly engage the lower portions of the base 11, as for example in the bosses 24.

The base 11 may be composed of any suitable material, as for example cast iron or aluminum, or if desired may be composed of molded plastic of the "Bakelite" type.

Since each of the opposed pairs of cups 12, forms a complete cooking unit, a description of one of such units will suffice for all. As seen in Figure 2, each of the cup mounting pedestals 20 and 21 is provided with an orifice by means of which the cups 25 and 26 are secured in place. The cups 25 and 26 are preferably composed of an electrical insulating material and may be composed for example of molded plastic, such as "Bakelite." The dimensions of each cup are governed by the general size of the frankfurter 30 with which the device is to be used, and cups having an internal mouth diameter of an inch and a half and an internal depth of an inch and a half have been found satisfactory with the usual size frankfurter. By reason of the fact that the cup mounting pedestals 20 and 21 are angularly disposed with relation to each other, the mouths of the cups 25 and 26 also face each other to a certain degree. This deviation from the vertical, facilitates the insertion and removal of the frankfurter 30 into and out of the cups 25 and 26.

Since each of the cups 12 is mounted in a similar manner, the description of the mounting of one will suffice for all. The cup 25 as seen in Figure 2 has the bottom wall thereof centrally orificed and a bolt 27 is passed first through a packing washer 28, thence through the orifice in the bottom wall 29 of the cup 25, thence through an insulating washer 31, following that another insulating washer 32, an electric contact lug 33, and finally a nut 34. The packing washer 28 is preferably composed of a resilient material as the compression of this washer serves to prevent any leakage through the opening in the bottom wall 29 of the cup 25. The orifice in the pedestal 20 is larger than the diameter of the bolt 27, and the insulating washer 31 serves to prevent the bolt from contacting the inner edges of the pedestal 20 bordering said orifice. The insulating washer 32 is larger than the orifice in the pedestal 20 so that when the nut 34 is drawn up tightly, the cup 25 is securely mounted on the pedestal 20. If desired, a known lock-nut may be disposed between the lug 33 and the nut 34. The washers 31 and 32 are preferably composed of a relatively rigid insulating material which has a high resistance to the absorption of moisture, as for example "Bakelite." The bolt 27 is preferably composed of not easily corrodible material, as for example Monel metal, stainless steel, or solidified graphite, or the head of the bolt may be composed of carbon. The bolts associated with the opposite pairs of cups such as 25 and 26 are connected in parallel in accordance with the schematic wiring diagram shown in Figure 7 by means of wiring (not shown) which is connected to the lugs such as 33 associated with each of the bolts. The connectors 37 and 38 pass outwardly through an orifice in the wall 17 to form the power cable 39 which terminates in the connector plug 40. The switch 41 operates in the well known manner to turn the device on or off.

Each of the cups 12 is provided with a contact pad generally indicated by numeral 35, two of these pads being shown in Figure 2, indicated by numerals 35 and 36. As shown in Figure 2, the pads 35 and 36 may be composed of a quantity of absorbent cotton. It is preferable that the absorbent cotton be rolled upon itself into a ball before being inserted into the cups 25 and 26 so that the fibers become slightly felted. This prevents the loose fibers from becoming attached to the frankfurter 30 during the cooking process. An alternate method of forming the contact pads 35 is to blank out circular disks from a sheet of felted cotton. Such pads will appear as seen in Figure 3.

In order to make the device function, it is necessary to moisten the pads 35 and 36 with a suitable electrolytic solution, as for example a water solution of sodium chloride or sodium bicarbonate.

Operation

Assuming the plug 40 to have been inserted in a suitable source of electrical energy and the switch 41 in the "off" position thereof, the pads 35 and 36 are saturated with electrolytic fluid. The frankfurter 30 is grasped and the ends thereof are inserted into intimate contact with the upper surface of the pads 35 and 36. If the frankfurter is of the so called "skinless" type, no treatment of the frankfurter is necessary, since the coating substituted for the skin is highly hygroscopic and is a good conductor when wet. If the frankfurter is of a type made with an animal intestine covering, it may be necessary to slightly puncture the same in order to get sufficient electrical continuity. In inserting the frankfurter 30 into the cups 25 and 26, it is not necessary to force the same, but ordinarily when the pads 35 and 36 are saturated, the weight of the frankfurter itself is sufficient to lower the ends of the frankfurter 30 sufficiently into the pads 35 and 36 to get the proper contact at the very ends of the frankfurter.

After the frankfurter 30 has been properly inserted within the cups 25 and 26, the switch 41 is turned to the "on" position thereof and by reason of the resistance offered to the passage of the flow of electricity therethrough, the frankfurter 30 begins to heat. Within a period usually between one and two minutes, the frankfurter becomes sufficiently heated and cooked. At this time, the frankfurter 30 has a tendency to swell and to straighten out, so that the ends thereof is bearing upon the inner surfaces of the cups 25 and 26 which are angularly disposed, tend to force themselves within the cup rather than out of it. When the frankfurter is completely cooked, the switch 41 is turned to the "off" position and the frankfurter 30 is removed.

Instead of moistening the pads 35 and 36 with an electrolytic solution, the pads may previously have been treated to include suitable chemicals impregnated therein. For example, the pad 35 may be soaked in a salt-water solution and subsequently dried. Then, when the pad is inserted within the cup, it only requires the addition of a small amount of water to make the same operative.

After a considerable number of frankfurters have been cooked in the device, there may have been some exudation upon the pads 35 and 36. It then becomes a simple matter to remove the pads and to substitute new ones therefor, since they are so low in cost.

Turning now to the other form of the invention illustrated in Figures 4, 5 and 6, in order to avoid unecessary repetition, parts corresponding to the first embodiment are given the same numeral with an added prime mark. In accordance with the latter form of the invention, the pad 50' is composed of a portion of absorbent cotton felt 35' upon which or within which is distributed a desired quantity of crystalline or powdered chemical 51', such as salt. The cotton felt and chemical are placed upon a square or gauze 52' which is folded thereover to form a neatly wrapped pad 50', seen in Figure 6. While shown as being square in Figure 6, the inherent softness of the pad 50' allows it to conform to the inner shape of the cup 54'. As seen in Figure 4, the inner wall of the cup 25' is provided with an inwardly projecting annular flange or retainer 53', which serves to keep the pad 50' in place. The operation of this form of the invention is similar to that described hereinabove, it being noted that it is not necessary to add an electrolytic solution, but merely water, since when the pad 50' becomes saturated, the chemical 51' goes into solution.

The composition of the pads 35' and 50' may be varied within certain limits without departing from the essential feature of the present invention. It is desirable that the pads be composed either of an absorbent material such as absorbent cotton or wool, or that they be of such a nature that they function in the manner of a wick. For example, the pads may take the form of either rubber or natural sponge or may be composed of a plurality of laminations of woven or knitted fabric. It is also desirable that the pads be not too stiff lest they prevent a sufficient area of the pad from coming in contact with the end of the frankfurter which is usually convex. In "giving" a little, a shallow depression is formed in the upper surface of the pad which while it does not extend up the sides of the frankfurter sufficiently enough to short circuit said end, does distribute the electrical current over a sufficient area so that burning does not occur. It has been found that the pads do not require frequent moistening because by reason of the wick-like action thereof, a concentration of moisture in the lower portions thereof will be brought to the active upper surface of the pad by capillarity.

It may thus be seen that I have disclosed the construction and operation of a novel frankfurter cooking machine which is inexpensive, simple, quick, clean and convenient, and extremely efficient in operation and which thoroughly heats each frankfurter from end to end, leaving no cold portions and not charring the frankfurter in any place.

I wish it to be understood that I do not desire to be limited to the exact details of construction shown and described for obvious modifications will occur to a person skilled in the art.

I claim:

1. An electrical frankfurter cooking machine, including: a pair of spaced vessels; contacts for electrical energy in each of said vessels; an annular flange inwardly projecting from the inner walls of each of said spaced vessels; absorbent means in association with said contacts and maintained in position with said contacts by the said flanges; and an electrolytic medium in said absorbent means whereby the ends of a frankfurter in touching the absorbent means complete an electrical circuit, said absorbent means acting to physically restrain the immersion of the ends of the frankfurter into the liquid electrolytic medium.

2. An electrical frankfurter cooking machine including: a base; cup mounting pedestals angularly disposed with relation to said base and inclined toward each other; a pair of cylindrical cups having open tops and closed bottoms, said bottoms being independently mounted upon said pedestals; contacts for electrical energy in said bottom of each of said cups; an annular flange inwardly projecting from the inner walls of each of said cups; a contact pad in each of said cups and in association with said contacts, said pad being composed of a quantity of concentrated soluble electrolyte forming material incorporated with a body of absorbent material and wrapped in gauze; whereby the addition of a solvent to said pads will dissolve some of the electrolyte forming material thereby producing an electrolytic solution in each of said cups; said flanges acting to prevent movement of said contact pads outwardly of the cups when the contact pads have been wet by the solvent; the ends of the frankfurter in touching the said pads acting to complete an electrical circuit, the pads restraining the immersion of the ends of the frankfurter into the electrolytic medium.

ARTHUR STERN.